(12) United States Patent
Araujo

(10) Patent No.: US 6,785,582 B2
(45) Date of Patent: Aug. 31, 2004

(54) INTEGRATED TRACKING SYSTEM

(75) Inventor: Juan A. Araujo, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 101 days.

(21) Appl. No.: 10/082,932

(22) Filed: Feb. 25, 2002

(65) Prior Publication Data
US 2003/0163216 A1 Aug. 28, 2003

(51) Int. Cl.[7] .............................................. G06F 19/00
(52) U.S. Cl. ...................... 700/106; 700/107; 700/101; 707/102
(58) Field of Search .............................. 700/101, 106, 700/107; 705/1, 5, 7; 707/102

(56) References Cited

U.S. PATENT DOCUMENTS 6,115,690 A * 9/2000 Wong .............................. 705/7
6,134,557 A * 10/2000 Freeman ...................... 707/102
2002/0111819 A1 * 8/2002 Li et al. ........................ 705/1

* cited by examiner

Primary Examiner—Leo Picard
Assistant Examiner—Michael D Masinick
(74) Attorney, Agent, or Firm—Bachman & Lapointe, P.C.

(57) ABSTRACT

The present invention relates to an integrated tracking system and method for providing a company and its customers with information about part and repair status. The tracking system broadly comprises a central processing unit for receiving data about a plurality of parts to be tracked. The central processing unit includes a staging table module for receiving and gathering the inputted data, a master table module for receiving the inputted data from the staging table module and for analyzing, organizing, and standardizing the inputted parts data, and a temporary table module for aggregating transactional records about the parts, which transactional records contain performance metrics on the parts.

21 Claims, 1 Drawing Sheet

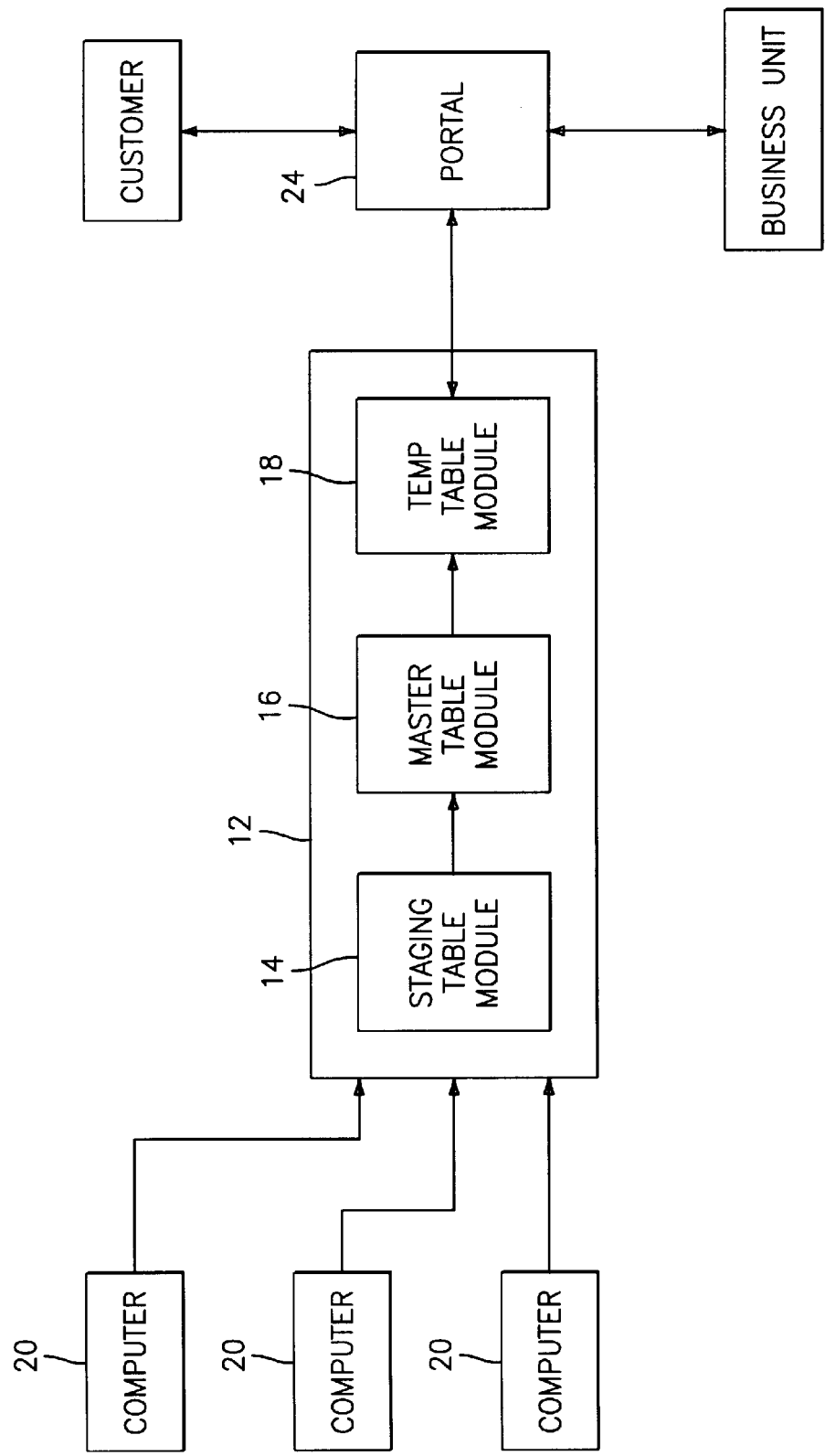

INTEGRATED TRACKING SYSTEM

BACKGROUND OF THE INVENTION

The present invention relates to an integrated system and a method for tracking parts used in effecting repairs. The system and the method of the present invention have particular utility in the tracking of repair parts and repair orders for jet engines and other turbomachinery devices.

Currently, information about parts needed for repairs on jet and turbine engines are kept in a plurality of computer systems in a number of different locations. For example, suppliers of various engine parts store information about the status of such parts, e.g. delivery dates, manufacturing dates, etc., in one format on their in-house computer systems. At the same time, repair facilities, which require and utilize the parts, often store data in a different format using different designations (names and part numbers) for the parts. Still further, company business units store data on their own computer systems. As a result of this complex situation, there generally is no efficient way to track the status of repair parts and provide customers with the information they desire about repair status and delivery dates. It is also difficult for customers to access current information about requested repairs.

It is also difficult with current record keeping systems to obtain historical data as to the performance of particular suppliers and repair facilities and as to the performance of the parts themselves.

SUMMARY OF THE INVENTION

Accordingly, it is an object of the present invention to provide an integrated tracking system and method which consolidates information about one or more repair parts from a plurality of sources and standardizes the information.

It is a further object of the present invention to provide an integrated tracking system and method which allows customized reports about the status of one or more repair parts to be supplied to a company business unit and its customers.

It is a further object of the present invention to provide an integrated tracking system and method which provides notifications to customers about changes in part status.

The foregoing objects are attained by the integrated tracking system and method of the present invention.

In accordance with the present invention, an integrated tracking system for tracking parts broadly comprises means for inputting data about a plurality of parts to be tracked into a central processing unit, a staging table module means in the central processing unit for receiving and gathering the inputted data, a master table module means in the central processing unit for receiving the inputted data from the staging table module and for analyzing, organizing and standardizing the inputted parts data, and a temporary table module means in the central processing unit for aggregating transactional records about the parts. The transactional records preferably contain performance metrics on the part which is the subject of each transactional record.

Further, in accordance with the present invention, a method for tracking parts broadly comprises the steps of providing a central processing unit having a staging table module, a master table module, and a temporary table module, inputting data about a plurality of parts from a plurality of business units into a central processing unit, collecting the inputted data in the staging table module in the central processing unit, and analyzing, organizing, and standardizing the inputted data in the master table module to create a database of information about customer orders and part status. The method further comprises accessing the information database in the master table module and aggregating data concerning particular transactions into transactional records in the temporary table module.

Other details of the integrated tracking system of the present invention, as well as other objects and advantages attendant thereto, are set forth in the following detailed description and the accompanying drawings wherein like reference numerals depict like elements.

BRIEF DESCRIPTION OF THE DRAWING(S)

The FIGURE is a schematic representation of an integrated tracking system in accordance with the present invention.

DESCRIPTION OF THE PREFERRED EMBODIMENT(S)

Referring now to the FIGURE, an integrated tracking system 10 is illustrated for tracking parts used to repair machinery, such as jet engines and turbine engines. The system 10 includes a central processing unit 12 which may comprise any suitable computer system or information processing unit known in the art. The central processing unit 12 has a number of modules including a staging table module 14, a master table module 16, and a temporary table module 18. The modules 14, 16, and 18 and their functionality will be described hereinafter.

Typically, information about repair parts is located in computers 20 in a variety of locations such as repair facility sites, supplier sites, and company business unit sites. This information typically includes descriptions of the parts, part numbers, customer orders, delivery dates, scrap information, pricing, on time delivery data, etc. Ascertaining the status of a particular part or a repair order is difficult because the information is generally stored in the computers 20 in a non-standardized manner, i.e. different formats, different part designations, different part numbers, etc. Hence, the need for a system such as the integrated tracking system 10 of the present invention.

Data within the computers 20 about the location and status of the repair parts at each of the aforementioned locations is inputted into the central processing unit 12. The data may be inputted into the central processing unit 12 using any suitable means known in the art. For example, the data from each computer 20 may be inputted manually. Alternatively, the data from each computer 20 may be downloaded by transferring data files from each of the computers 20 to the central processing unit 12 using any suitable transfer or downloading technique known in the art. If desired, the data may be edited, using any suitable technique known in the art, either before or after being inputted into the central processing unit 12. The inputted data is gathered and stored in the staging table module 14. The staging table module 14 may be a portion of the central processing unit's storage memory which is programmed to receive the downloaded or inputted data information and save same for a period of time. The staging table module may be programmed in any suitable computer language known in the art.

Once the data about the repair parts has been inputted and/or edited, it is transferred to a master table module 16 where a centralized part information database is created and stored. In the master table module 16, the repair part data is analyzed to obtain a desired set of information, such as information about the type of parts, part numbers, part descriptions, delivery dates, shipping dates, scrap information, names of customers, names of repair facilities, purchase order numbers, job numbers, completion dates, etc. Using this information, performance metrics for the parts and the repair orders are calculated within the master table module 16. The repair part data may then be organized in any desired manner and standardized so that all the repair part data is in a common format and standard names and numbers are used to describe the parts, the part numbers, the identification of each repair facility, each business unit, and each supplier, purchase order numbers, and customer identifications. The master table module 16 may be programmed in any suitable computer language known in the art to carry out the foregoing functions.

Additionally, the master table module 16 may be programmed to organize and standardize information about part shipments and scrap parts and to segregate this information in a particular memory storage location within the master table module 16 to facilitate its retrieval.

In the temporary table module 18, calculated data retrieved from the master table module 16 may be aggregated into transactional records. If desired, the data may be aggregated by purchase order line item. Each transactional record may be arranged to indicate all transactions involving a particular part or purchase order. Each transactional record may contain one or more line entries about a particular part. Each line entry may include information such as the part name, part receipt date, the purchase order number, the job number, the commit date, the customer required date, the completion date, the number of parts shipped, the number of parts scrapped, remaining inventory, and turn around time.

The system 10 further includes means for accessing the repair part data within the system. In the case of a company business unit, the central processing unit 12 may form part of an in-house network which can be accessed by authorized employees through laptops or desk-top computers. For employees in remote locations, the central processing unit may be accessed via a company website or a portal 24. In the case of customers and suppliers, access may be provided through the company website or the portal 24 via the Internet.

If desired, access to certain information stored in the central processing unit 12, and in particular in the master table module 16 and the temporary table module 18, may be restricted to authorized system users only. This can be done through the use of logins and password protection.

Customers can use the tracking system 10 to request information about particular repair jobs. This may be done by accessing the central processing unit 12 via the portal 24 and requesting information about a particular purchase order or orders. When a customer accesses the system 10, the customer may first see a login screen and then a welcome screen. Then the customer may see an input screen having a menu on which he may find a user profile, contact information for each company business unit and for technical support, a help box, a part repair status box, and a data input box. By selecting the part repair status box, the customer may have several options including, but not limited to, the selection of a quick status report on a particular purchase order and a customized report in which the customer selects the data which the customer wishes to receive by viewing a plurality of information fields and selecting a desired set of said fields. To accomplish this, a custom report generator may be incorporated into the system 10. The quick status report and/or the customized report may be delivered to the customer in any suitable manner known in the art such as by e-mail or by an onscreen display that can be printed.

Typically, a purchase order is broken by a company business unit into a plurality of work orders. The central processing unit 12 collects all data relating to the work orders stored in the master table module 16 and transfers the data to the temporary table module 18. The temporary table module 18 then gathers all data and the calculated performance metrics relating to a requested purchase order. Since the performance metrics are already calculated, the requested purchase order information can be retrieved and delviered quickly. A typical transactional record for a purchase order requested by a customer may contain information about the facility or facilities where the parts are located, the purchase order number, the job number, the part number, the commit date, the completion date, the number of parts received, the number of parts shipped, the number of parts scrapped, the number of remaining parts, and the turn around time.

A company business unit can use the tracking system 10 to obtain reports about the status of repair orders placed by a particular customer by clicking on the part repair status box on the menu and inserting information about the customer of interest. The company business unit can also use the tracking system 10 to obtain reports about the performance of repair facilities and the performance of suppliers. For example, the company business unit can obtain reports about shipments (closed purchase orders), backlog orders (open purchaser orders), fill rates (customer required date vs. shipped date), number of commitments, and repair cost forecast based on past historical invoices.

The company and its business units can input data into the tracking system 10 via the data input box. Further, the data may be edited as needed.

The tracking system 10 may be provided with an automatic notification system which has the ability to dynamically notify clients when there is a change in the delivery status of one or more of their orders. The tracking system 10 may also be provided with email capability for users to contact the appropriate customer service for specific orders. The tracking system 10 may be provided with these functionalities via suitable programming of the central processing unit 12.

While the system and method of the present invention have been described in the context of tracking parts used in the repair of machinery such as jet engines and turbine engines, it should be noted that the system and method could equally be used to track parts used to repair other devices as well as to track inventories of any such parts or even assemblies of parts such as modules, engines, or other devices.

It is apparent that there has been provided in accordance with the present invention an integrated tracking system which fully satisfies the objects, means, and advantages set forth hereinbefore. While the present invention has been described in the context of specific embodiments thereof, other alternatives, variations, and modifications will become apparent to those skilled in the art having read the foregoing description. Accordingly, it is intended to embrace those alternatives, modifications, and variations as fall within the broad scope of the appended claims.

What is claimed is:

1. A method for tracking parts comprising:
   providing a central processing unit having a staging table module, a master table module, and a temporary table module;

inputting data about a plurality of parts from a plurality of business units into the central processing unit;

collecting said inputted data in said staging table module; and analyzing, organizing, and standardizing said inputted part data in said master table module and creating an information database about customer orders and part status;

wherein said creating step comprises creating a centralized repair parts information database and storing said centralized repair parts information database in said master table module.

2. A method according to claim 1, further comprising accessing said information database in said master table module and aggregating data concerning particular transactions into transactional records in said temporary table module.

3. A method according to claim 2, wherein said aggregating step comprises aggregating said data by purchase order line item.

4. A method according to claim 2, further comprising providing access to said information database to a remote requestor.

5. A method according to claim 4, wherein said access providing step comprises accessing said central processing unit via a portal and the Internet.

6. A method according to claim 4, wherein said accessing means includes requesting customized reports and said method further comprises creating said customized reports from said information database information and delivering said customized reports to said requestor.

7. A method according to claim 6, wherein said customized report requesting step comprises providing an input screen having a plurality of fields and said requestor selecting a desired set of said fields.

8. A method according to claim 6, wherein said delivering step comprises delivering said customized reports to said requestor via at least one of e-mail and an onscreen display.

9. A method according to claim 1, further comprising issuing notifications about changes in part status to a customer.

10. A method according to claim 1, wherein said analyzing steps comprises analyzing said data to determine an identity of each said business unit from which said data has been inputted and to obtain information about each part description, and each part designation used by each said business unit for each said part being tracked.

11. A method according to claim 10, further comprising analyzing said inputted data to gather information about part shipments and scrap parts and segregating said information about said part shipments and said scrap parts.

12. A method according to claim 10, wherein said standardizing step comprises assigning a standardized company name to each business unit and a standardized part description and number for each said part being tracked.

13. A method according to claim 1, wherein said analyzing step comprises analyzing repair part data in said master table module, said organizing step comprises organizing said repair part data, and said standardizing step comprises standardizing said repair part data so that all said repair part data is in a common format and so that all repair parts are described by standardized names and numbers.

14. An integrated system for tracking parts comprising:

means for inputting data about a plurality of parts to be tracked into a central processing unit;

a staging table module means in said central processing unit for receiving and gathering said inputted data;

a master table module means in said central processing unit for receiving said inputted data from said staging table unit and for analyzing, organizing, and standardizing said inputted part data; and a temporary table module means in said central processing unit for aggregating transactional records about each said part, wherein each said transactional record contains performance metrics on a particular part.

15. An integrated tracking system further according to claim 14, further comprising means for accessing and requesting information from said central processing unit about a particular repair order status.

16. An integrated tracking system according to claim 15, wherein said accessing means comprises a portal for allowing access to said central processing unit via the Internet.

17. An integrated tracking system according to claim 15, further comprising means for delivering a report about said particular repair order status to a requestor.

18. An integrated tracking system according to claim 14, wherein said master table module means is programmed to segregate shipment and scrap details for each part from said part data.

19. An integrated tracking system according to claim 14, wherein said master table module means is programmed to change and standardize all designations for a particular part to a single part designation.

20. An integrated tracking system according to claim 14, wherein said master table module means is programmed to place all part data into a single format.

21. An integrated tracking system according to claim 14, wherein said temporary table module is programmed to aggregate all of said transactional records by purchase order line item.

* * * * *